United States Patent
Shi et al.

(10) Patent No.: US 12,000,642 B2
(45) Date of Patent: Jun. 4, 2024

(54) APPLIANCE WITH ICE PACKER

(71) Applicant: Electrolux Home Products, Inc., Charlotte, NC (US)

(72) Inventors: Zhuochen Shi, Clemson, SC (US); Thomas McCollough, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 234 days.

(21) Appl. No.: 17/356,905

(22) Filed: Jun. 24, 2021

(65) Prior Publication Data
US 2022/0412628 A1    Dec. 29, 2022

(51) Int. Cl.
*F25C 5/02* (2006.01)
*F25C 1/10* (2006.01)
*F25C 5/182* (2018.01)

(52) U.S. Cl.
CPC .................. *F25C 5/02* (2013.01); *F25C 1/10* (2013.01); *F25C 5/182* (2013.01); *F25C 2305/022* (2013.01); *F25C 2400/10* (2013.01); *F25D 2303/081* (2013.01)

(58) Field of Classification Search
CPC .... F25C 5/02; F25C 1/10; F25C 5/182; F25C 2305/022; F25C 2400/10; F25D 2303/081
See application file for complete search history.

(56) References Cited

U.S. PATENT DOCUMENTS

| | | | |
|---|---|---|---|
| 4,153,404 A | 5/1979 | Ottman | |
| 6,062,036 A | 5/2000 | Hobelsberger | |
| 2006/0086129 A1* | 4/2006 | Anselmino | F25C 5/22 |
| | | | 62/344 |

FOREIGN PATENT DOCUMENTS

| | | |
|---|---|---|
| CH | 276521 | 7/1951 |
| CN | 104930777 | 9/2015 |
| CN | 204787485 | 11/2015 |
| CN | 111174483 | 5/2020 |
| GB | 2410998 | 8/2005 |
| JP | H1-94882 | 6/1989 |
| KR | 20060008794 | 1/2006 |
| KR | 20060008794 A * | 1/2006 |
| WO | 2008131770 | 11/2008 |

OTHER PUBLICATIONS

KR-20060008794-A translation.*
International Search Report and Written Opinion for PCT/US2022/028732, dated Aug. 23, 2022, 15 pages.

* cited by examiner

*Primary Examiner* — Elizabeth J Martin
(74) *Attorney, Agent, or Firm* — Pearne & Gordon LLP (57) ABSTRACT

A refrigerator appliance includes an ice packer assembly including an enclosure with a rotatable door, and an ice mold slidably supported by the enclosure. The ice mold is configured to translate between a first position and a second position. The door is configured to rotate from a first orientation to a second orientation as the ice mold is translated from the first position to the second position. The enclosure defines a pass-through opening therethrough. The door opens up the pass-through opening when rotated to the first orientation, and closes the pass-through opening and defines a platform for receiving crushed ice thereon when it is rotated to the second orientation.

19 Claims, 10 Drawing Sheets

APPLIANCE WITH ICE PACKER

FIELD OF THE INVENTION

This application relates generally to a refrigerator appliance including an ice packer assembly, and more particularly, to a refrigerator appliance with an ice packer assembly to form chewable ice.

BACKGROUND OF THE INVENTION

Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C., such as between 0.25° C. and 4.5° C. and the freezer compartments at temperatures below 0° C., such as between 0° C. and −20° C.

The arrangements of the fresh food and freezer compartments with respect to one another in such refrigerators vary. For example, in some cases, the freezer compartment is located above the fresh food compartment and in other cases the freezer compartment is located below the fresh food compartment. Additionally, many modern refrigerators have their freezer compartments and fresh food compartments arranged in a side-by-side relationship. Whatever arrangement of the freezer compartment and the fresh food compartment is employed, typically, separate access doors are provided for the compartments so that either compartment may be accessed without exposing the other compartment to the ambient air.

Conventional refrigerator appliances also generally include an ice maker assembly that is configured to produce ice cubes which are made available to a user via a removable ice bucket or through a dispenser provided on the refrigerator door. A conventional ice maker assembly includes a tray defining a plurality of ice molds therein for receiving water that is frozen (via convective heat exchange with cold air) to form solid or densely formed ice cubes. Some appliances also include a crushing mechanism (comprising fixed and rotating blades) that is operable to crush ice cubes produced by the ice maker to form crushed ice. Yet, there is an increasing demand for a new form of ice commonly referred to as nugget or chewable ice. Chewable ice is softer and less dense than a traditional ice cube thereby making it chewable, which is desirable among a growing segment of users. Accordingly, there exists a need for a refrigerator appliance that can produce traditional ice cubes and/or crushed ice, while being versatile to produce chewable ice.

BRIEF SUMMARY OF THE INVENTION

The following presents a simplified summary of the disclosure in order to provide a basic understanding of some example aspects described in the detailed description. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In accordance with one aspect, there is provided an ice packer for an appliance to form chewable ice cubes. The ice packer includes an enclosure defining a pass-through opening extending between an upper end and a lower end thereof. A door is pivotally coupled to the enclosure and is rotatable between a first orientation and a second orientation. The door opens the pass-through opening when it is rotated to first orientation and closes the pass-through opening when it is rotated to the second orientation. An ice mold is slidably supported by the enclosure and defines an ice mold therein. The ice mold is configured to translate between a first position and a second position. When the door is rotated to the second orientation, it defines a platform for receiving ice thereon that is compacted in the cavity of the ice mold when the ice mold is translated toward the second position.

In accordance with another aspect, there is provided an ice packer assembly for a refrigerator appliance including a reciprocating mechanism and an ice packing compartment. The ice packing compartment includes an enclosure defining a pass-through opening extending between an upper end and a lower end thereof. A door is pivotally coupled to the enclosure and rotatable between a first orientation and a second orientation. The door opens the pass-through opening when it is rotated to the first orientation and closes the pass-through opening when it is rotated to the second orientation. An ice mold is slidably supported by the enclosure and is pivotally coupled to the reciprocating mechanism. The reciprocating mechanism is configured to translate the ice mold between a first position and a second position relative to the enclosure.

In accordance with yet another aspect, there is provided an ice packer for producing chewable ice cubes. The ice packer includes an enclosure defining a pass-through opening extending between an upper end and a lower end thereof. A door is coupled to the enclosure and is movable between a first position and a second position. The door opens up the pass-through opening of the enclosure when it is moved to the first position and closes the pass-through opening and defines a platform for receiving ice thereon when it is moved to the second position. An ice mold is slidably supported by the enclosure and is configured to reciprocate between a first location and a second location. The ice mold is configured to form chewable ice cube when it is reciprocated to the second location.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure and together with the description serve to explain the principles and operations thereof.

BRIEF DESCRIPTION OF THE DRAWINGS

These and other features, aspects and advantages of the present disclosure can be further understood when read with reference to the accompanying drawings.

DESCRIPTION OF EXAMPLE EMBODIMENTS

Apparatus will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein.

Figure 1:
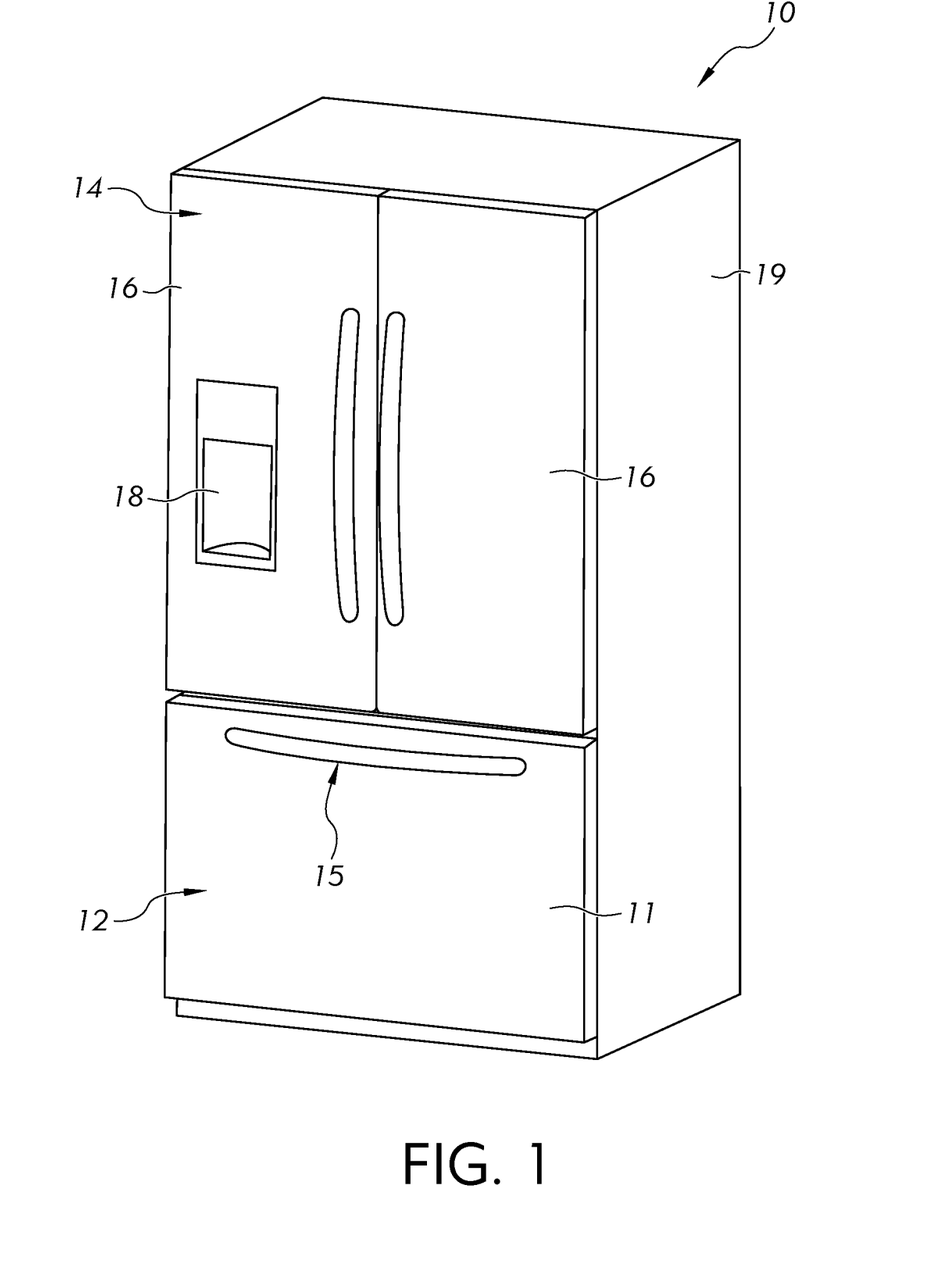
FIG. 1 is a front perspective view of a household French Door Bottom Mount refrigerator wherein doors of the refrigerator are in a closed position.

Referring now to the drawings, FIG. 1 shows a refrigeration appliance in the form of a domestic refrigerator, indicated generally at 10. Although the detailed description that follows concerns a domestic refrigerator 10, the invention can be embodied by refrigeration appliances other than with a domestic refrigerator 10. Further, an embodiment is described in detail below, and shown in the figures as a bottom-mount configuration of a refrigerator 10, including a fresh food storage compartment 14 disposed vertically above a freezer storage compartment 12. However, the refrigerator 10 can have any desired configuration including at least one of a fresh food storage compartment 14 and/or a freezer storage compartment 12, such as a top mount refrigerator (freezer disposed above the fresh food compartment), a side-by-side refrigerator (fresh food compartment is laterally next to the freezer compartment), a standalone refrigerator or freezer having a single main compartment, etc.

One or more doors 16 shown in FIG. 1 are pivotally coupled to a cabinet 19 of the refrigerator 10 to restrict and grant access to the fresh food storage compartment 14. The door 16 can include a single door that spans the entire lateral distance across the entrance to the fresh food storage compartment 14, or can include a pair of French-type doors 16 as shown in FIG. 1 that collectively span the entire lateral distance of the entrance to the fresh food storage compartment 14 to enclose the fresh food storage compartment 14.

Figure 2:
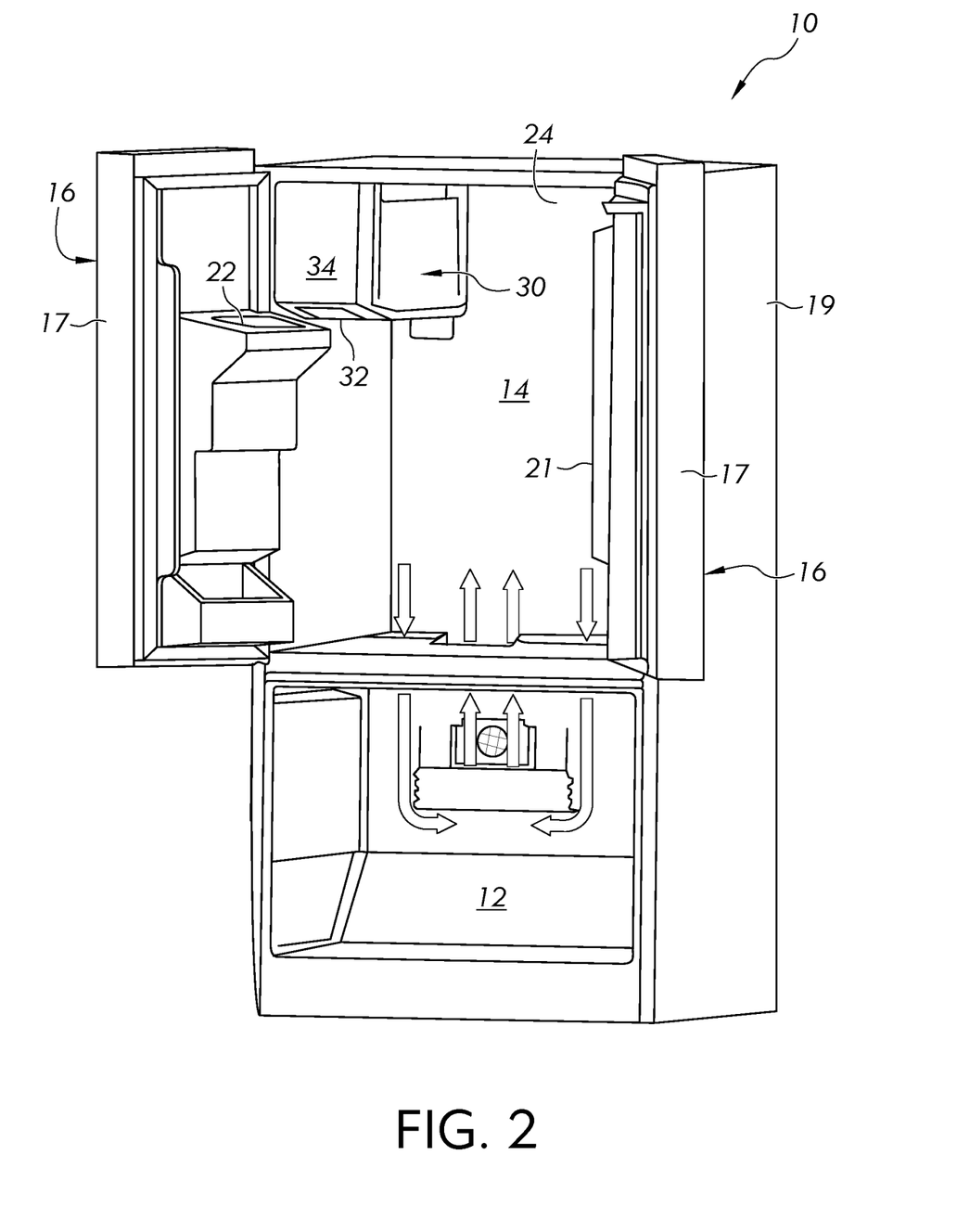
FIG. 2 is a front perspective view of the refrigerator of FIG. 1 showing the doors in an opened position and an interior of a fresh food compartment.

For the latter configuration, a center flip mullion 21 (FIG. 2) is pivotally coupled to at least one of the doors 16 to establish a surface against which a seal provided to the other one of the doors 16 can seal the entrance to the fresh food storage compartment 14 at a location between opposing side surfaces 17 (FIG. 2) of the doors 16. The mullion 21 can be pivotally coupled to the door 16 to pivot between a first orientation that is substantially parallel to a planar surface of the door 16 when the door 16 is closed, and a different orientation when the door 16 is opened. The externally-exposed surface of the center mullion 21 is substantially parallel to the door 16 when the center mullion 21 is in the first orientation, and forms an angle other than parallel relative to the door 16 when the center mullion 21 is in the second orientation. The seal and the externally-exposed surface of the mullion 21 cooperate approximately midway between the lateral sides of the fresh food storage compartment 14.

A dispenser 18 (FIG. 1) for dispensing at least ice pieces, and optionally water, can be provided on an exterior of one of the doors 16 that restricts access to the fresh food storage compartment 14. The dispenser 18 includes an actuator (e.g., lever, switch, proximity sensor, etc.) to cause frozen ice pieces to be dispensed from an ice bin 34 (FIG. 2) of an ice maker 30 disposed within the fresh food storage compartment 14. Ice pieces from the ice bin 34 can exit the ice bin 34 through an aperture 32 and be delivered to the dispenser 18 via an ice chute 22 (FIG. 2), which extends at least partially through the door 16 between the dispenser 18 and the ice bin 34.

Referring to FIG. 1, the freezer storage compartment 12 is arranged vertically beneath the fresh food storage compartment 14. A drawer assembly (not shown) including one or more freezer baskets (not shown) can be withdrawn from the freezer storage compartment 12 to grant a user access to food items stored in the freezer storage compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer storage compartment 12.

In alternative embodiments, the ice maker is located within the freezer compartment. In this configuration, although still disposed within the freezer compartment, at least the ice maker (and possibly an ice bin) is mounted to an interior surface of the freezer door. It is contemplated that the ice mold and ice bin can be separate elements, in which one remains within the freezer compartment and the other is on the freezer door.

The freezer storage compartment 12 is used to freeze and/or maintain articles of food stored in the freezer storage compartment 12 in a frozen condition. For this purpose, the freezer storage compartment 12 is in thermal communication with a freezer evaporator (not shown) that removes thermal energy from the freezer storage compartment 12 to maintain the temperature therein at a temperature of 0° C. or less during operation of the refrigerator 10, preferably between 0° C. and −50° C., more preferably between 0° C. and −30° C. and even more preferably between 0° C. and −20° C.

The refrigerator 10 includes an interior liner 24 (FIG. 2) that defines the fresh food storage compartment 14. The fresh food storage compartment 14 is located in the upper portion of the refrigerator 10 in this example and serves to minimize spoiling of articles of food stored therein. The fresh food storage compartment 14 accomplishes this by maintaining the temperature in the fresh food storage compartment 14 at a cool temperature that is typically above 0° C., so as not to freeze the articles of food in the fresh food storage compartment 14. It is contemplated that the cool temperature preferably is between 0° C. and 10° C., more preferably between 0° C. and 5° C. and even more preferably between 0.25° C. and 4.5° C. According to some embodiments, cool air from which thermal energy has been removed by the freezer evaporator can also be blown into the fresh food storage compartment 14 to maintain the temperature therein greater than 0° C. preferably between 0° C. and 10° C., more preferably between 0° C. and 5° C. and even more preferably between 0.25° C. and 4.5° C. For alternate embodiments, a separate fresh food evaporator can optionally be dedicated to separately maintaining the temperature within the fresh food storage compartment 14 independent of the freezer storage compartment 12. According to an embodiment, the temperature in the fresh food storage compartment 14 can be maintained at a cool temperature within a close tolerance of a range between 0° C. and 4.5° C., including any subranges and any individual temperatures falling with that range. For example, other embodiments can optionally maintain the cool temperature within the fresh food storage compartment 14 within a reasonably close tolerance of a temperature between 0.25° C. and 4° C.

Figure 3:
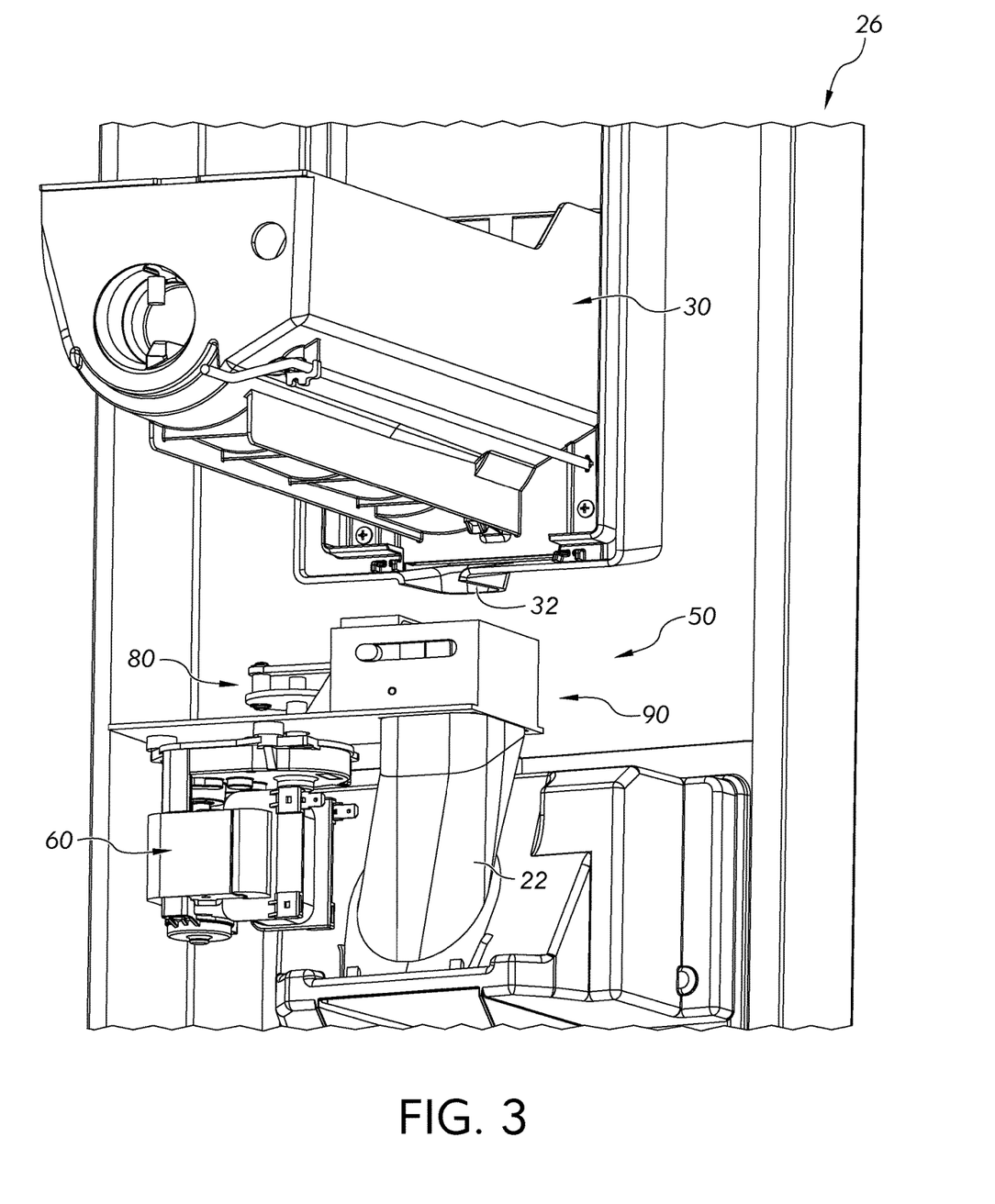
FIG. 3 is a rear perspective view of an example ice packer assembly shown in relation to an ice maker and a rear side of a refrigerator door.

Turning now to FIG. 3, a rear side of a refrigerator door 26 is shown in relation to the ice maker 30 of the refrigerator 10. In the illustrated example, a rear panel (i.e. liner) of the door 26, the cabinet 19 (FIG. 1) of the refrigerator 10 (FIG. 1), and the outer walls of the ice maker compartment have been removed for ease of illustration. The refrigerator door 26 includes an ice packer assembly 50 located generally adjacent to the door dispenser 18 and between an outlet 32 of the ice maker 30 and an ice chute 22 extending through the refrigerator door 26. In general, the ice packer assembly described herein improves the versatility of a refrigerator appliance by enabling users to make chewable ice cubes in addition to conventional ice cubes and crushed ice, as described in detail below. In the illustrated example, the ice packer assembly 50 generally includes a motor assembly 60, a reciprocating mechanism 80, and an ice packing compartment 90.

Figure 4:
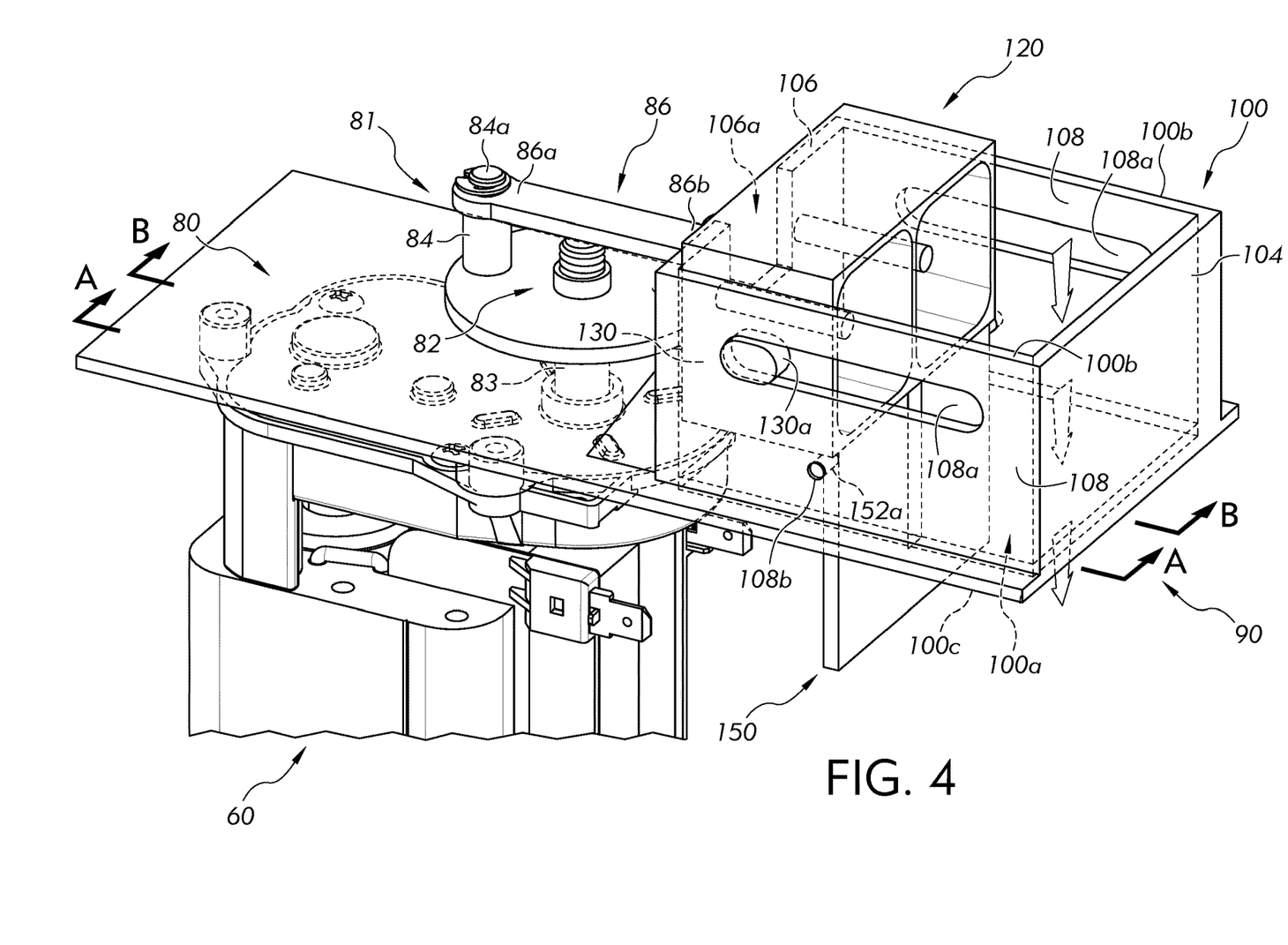
FIG. 4 is an enlarged, closeup perspective view of the ice packer assembly of FIG. 3.

Referring to FIG. 4, an enlarged perspective view of the ice making assembly 50 is shown with hidden features made visible via dashed lines. The ice packing compartment 90, in general, includes an enclosure 100, an ice mold 120, and a rotatable door 150. In the illustrated embodiment, the enclosure 100 is substantially-box shaped and defines a pass through opening 100a extending between an upper end 100b and a lower end 100c thereof. The enclosure 100 is preferably made of a material (e.g., aluminum alloy, stainless steel) suitable for low temperature use (i.e., at least zero degrees centigrade for handling frozen water ice) and having a suitable impact resistance or toughness. The enclosure 100 includes a front wall 104 and a rear wall 106 that are spaced apart and connected by opposing side walls 108. In some embodiments, it is contemplated that the front wall 104 of the enclosure may be made of metal (e.g., aluminum alloy, stainless steel), while the side walls 104 and rear wall 106 thereof are made of a plastic material, for example, in such embodiments wherein the front wall 104 is made available as a separate, replaceable component that is removably attached to respective front edges of the side walls 104, e.g., via screws, clips, insertion pins, and the like). Each side wall 108 defines a slot 108a extending along a partial longitudinal length thereof that is shaped and dimensioned to slidably receive a protrusion or slider 130a formed on a respective side wall 130 of the ice mold 120, as described in detail below. As shown in FIG. 4, each side wall 108 of the enclosure 100 defines an opening 108b that is dimensioned to accommodate therein a pivot pin 152a extending from a respective side of the rotatable door 150 such that door 150 may freely rotate with respect to the enclosure 100.

Figure 5:
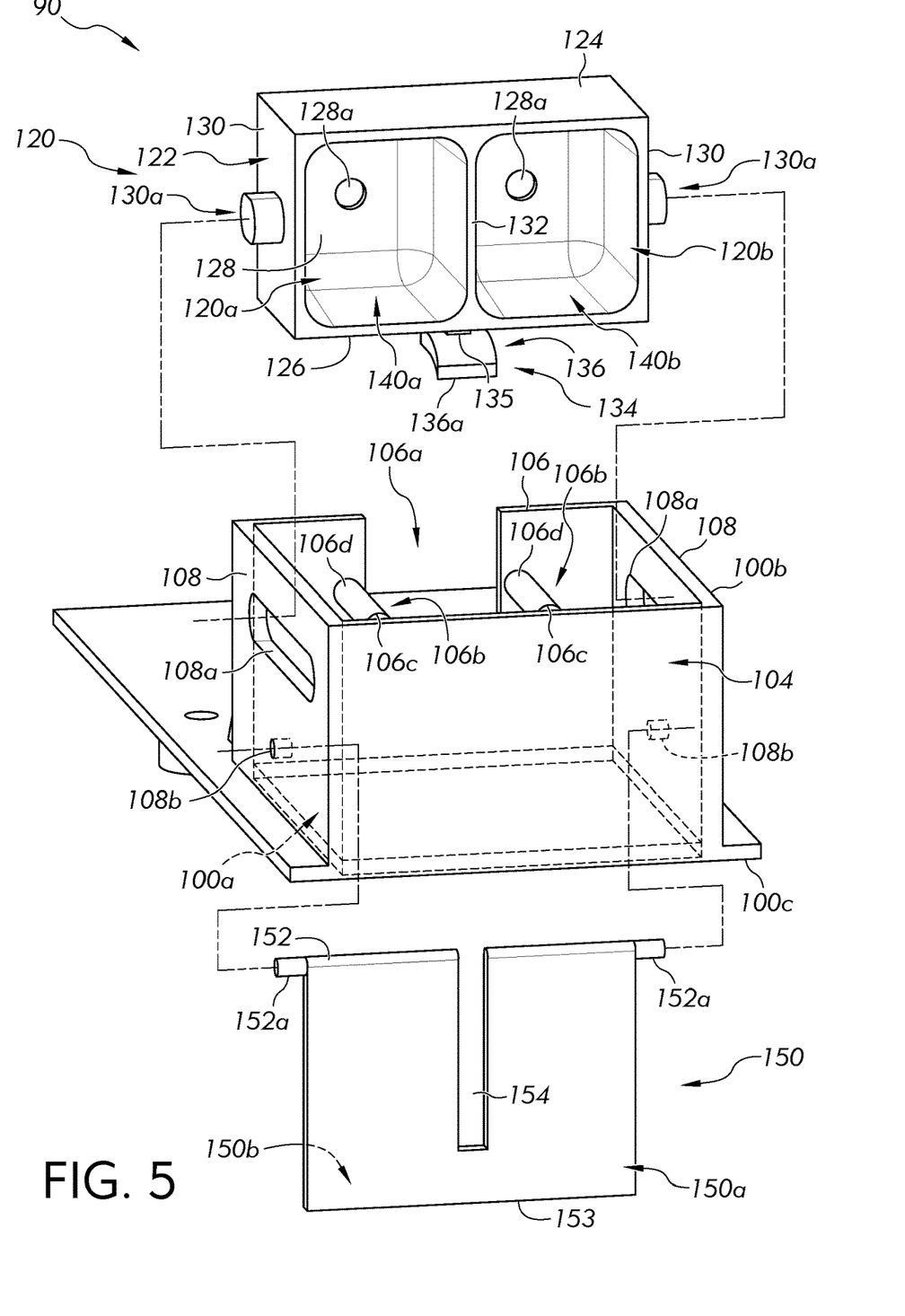
FIG. 5 is an exploded, perspective view of an ice packing compartment of the ice packing assembly of FIG. 3.

Referring to FIG. 5, an exploded perspective view of the ice packing compartment 90 is shown with hidden features made visible via dashed lines. In the illustrated example, a notch 106a is formed in the rear wall 106 of the enclosure 100 to permit a link 86 (FIG. 4) of the reciprocating mechanism 80 to pass therethrough, as described in detail below. The rear wall 106 also includes a pair of cantilevered ejector pins 106b extending therefrom and into an internal space of the enclosure 100. In the illustrated example, each ejector pin 106b comprises a cylindrical-shaped rod including an exposed distal end 106c and a proximal end 106d that is attached to or formed together with the rear wall 106 of the enclosure 100. In some embodiments, it is contemplated that the proximal ends 106d of the ejector pins 106b may be threaded (not shown) for rotatably engaging threaded openings (not shown) formed in the rear wall 106 of the enclosure 100, respectively, to attach the ejector pins 106b to the enclosure 100, or alternatively by attachment using an external screw. Yet, it is also contemplated that the proximal ends 106d may be permanently joined to the rear wall 106 of the enclosure 100, for example, via spot welds or another example of a welding fusion process, or even formed together therewith by a tooling manufacturing process or a molding process. In the illustrated embodiment, each ejector pin 106b comprises a diameter corresponding to (e.g., slightly smaller than) a diameter of a respective opening 128a formed in a rear wall 128 of the ice mold 120. In this manner, the ejector pins 106b may be extended through a rear wall 128 of the ice mold 120, as discussed in detail below.

Figure 8:
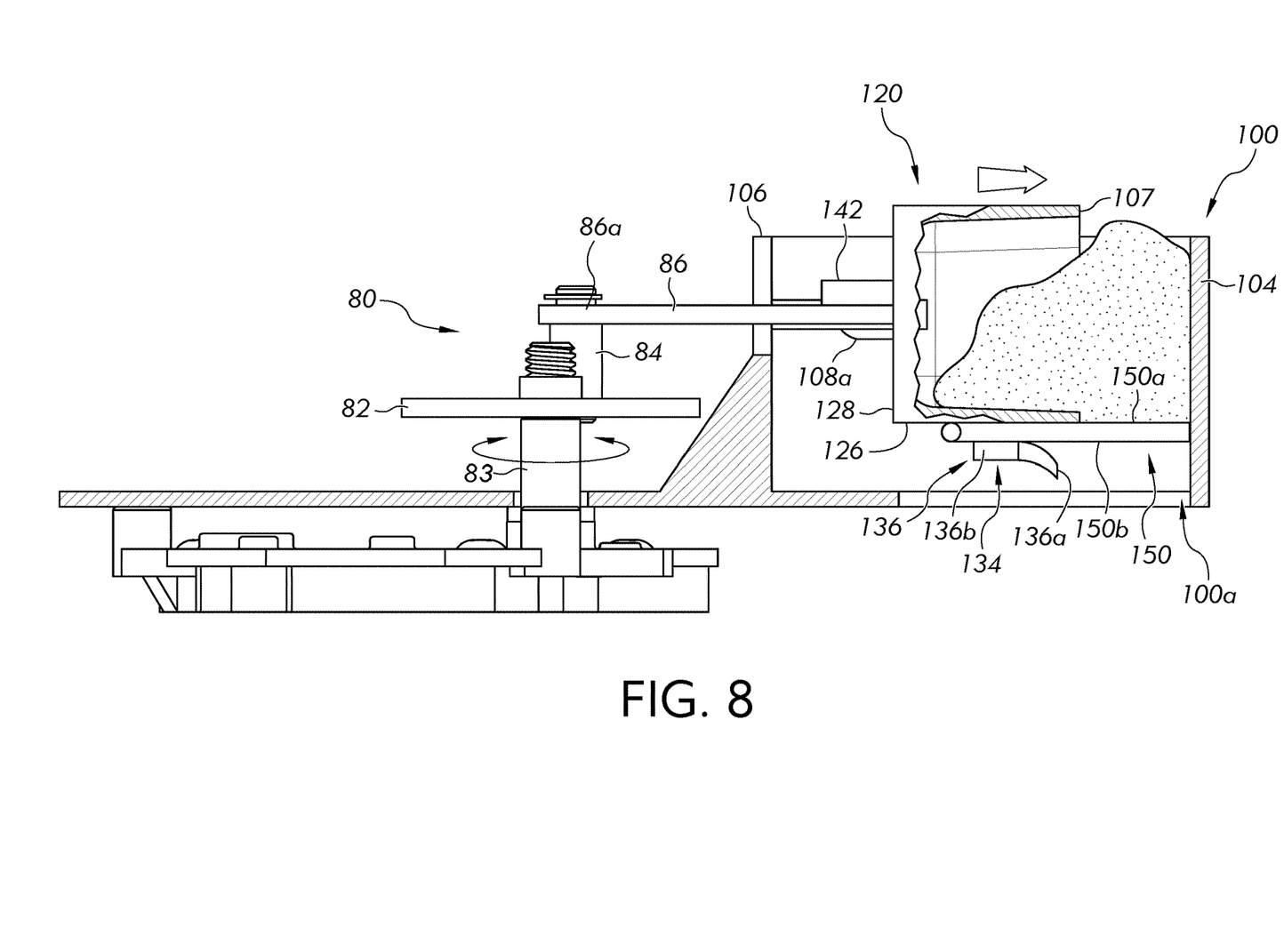
FIG. 8 is a side section view of the ice packer assembly of FIG. 4 taken along line A-A of FIG. 4 in a state wherein the door is shown in the second orientation.

Still referring to FIG. 5, the door 150 includes a first planar surface 150a and a second planar surface 150b that faces an opposite direction from the first planar surface 150a. As described above, the door 150 is pivotally coupled to the enclosure 100 via pivot pins 152a extending laterally from a rear end 152 thereof that are inserted into the respective openings 108b formed in the side walls 108 of the enclosure 100. In particular, the pivot pins 152a are dimensioned to freely rotate within the respective openings 108b to enable the door 150 to move or rotate between a first position or orientation (substantially vertical as shown) and a second position or orientation (substantially horizontal as shown in the example of FIG. 8). Preferably, the pivot pins 152a freely rotate within the respective openings 108b to enable the door 150 to fall downwards by gravity to the position shown in FIG. 6. Yet, it is contemplated that the door 150 and/or the enclosure 100 may comprise a different structure for enabling the door 150 to rotate with respect to the enclosure 100, for example, a door that is pivotally connected to a partial-bottom wall (not shown) of the enclosure via a hinge (not shown).

Figure 6:
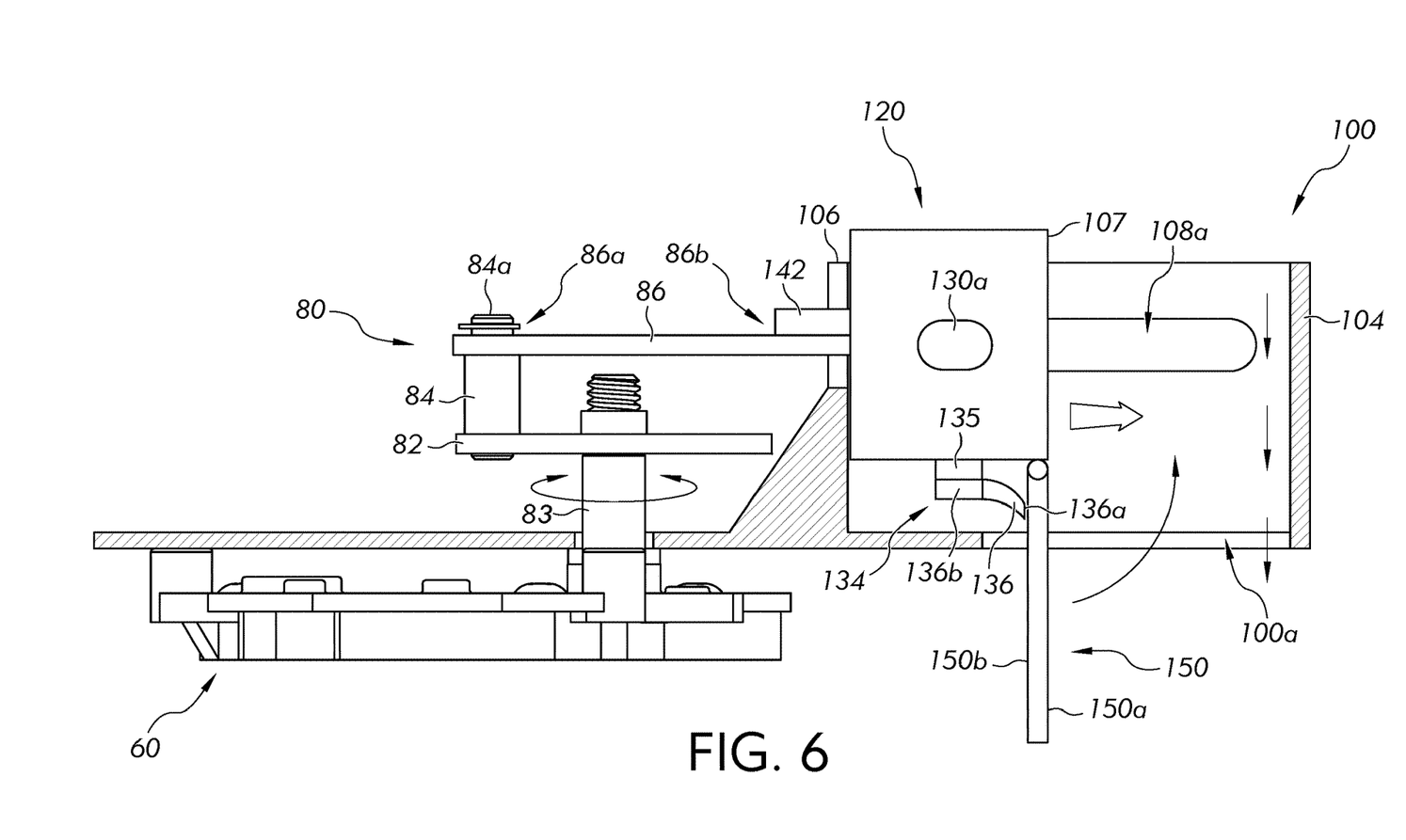
FIG. 6 is a side section view of the ice packer assembly of FIG. 4 taken along line A-A of FIG. 4 wherein an ice mold of the ice packing assembly is shown in a first position and a door of the ice packing assembly is shown in a first orientation.

As shown in FIG. 4, the door 150 opens the pass through opening 100a of the enclosure 100 when it is rotated to the first orientation (e.g., substantially vertical as shown) such that ice exiting an outlet 32 (FIG. 3) of the ice maker 30 may pass therethrough, whereupon it is directed to the ice chute 22 (FIG. 3) extending through the refrigerator door 26 of the appliance, e.g., leading to a dispenser 18 (FIG. 1) of the refrigerator 10 (FIG. 1). That is, when the door 150 is rotated to the first orientation as shown in FIGS. 4 and 6, ice dispensed from the ice maker 30 effectively bypasses the ice packer assembly 50. Such dispensed ice could include conventional whole cubes or conventional crushed ice. Conversely, when the door 150 is rotated to the second orientation (FIG. 8), the door 150 will close the pass-through opening 100a to define a platform for receiving finely crushed ice thereon, as discussed in detail below. Yet, it is contemplated that the door 150 and/or the enclosure 100 may comprise a different structure for causing the door 150 to open or close the pass-through opening 100a of the enclosure 100. For example, it is contemplated that the door 150 may be configured to slide between a first position (proximate a rear wall 106 of the enclosure 100) and a second position (proximate a front wall 104 of the enclosure 100) to respectively open and close the pass-through opening 100a, for example, in alternative embodiments wherein the door 150 is slidably received by the enclosure (not shown) and configured to reciprocate (e.g., linearly) between the respective first and second positions. Referring to FIG. 5, the door 150 also comprises a longitudinal slot 154 extending from a rear end 152 thereof toward a front end 153 thereof that is dimensioned to receive therethrough a narrowed portion 135 of a door guide 134 extending from a bottom wall 126 of the ice mold 120, as discussed in detail below.

As shown in FIG. 5, the ice mold 120 comprises a plurality of walls 122 defining a pair of mold cavities 140a and 140b therein that are configured to receive and compact finely crushed ice dispensed from the ice maker 30 to form chewable ice cubes (FIG. 10), as described in greater detail below. The ice mold 120 is preferably made of a of a material (e.g., aluminum alloy, stainless steel) suitable for use in low temperatures (i.e., at least zero degrees centigrade for handling frozen water ice) having a suitable impact resistance or toughness. Additionally, although the illustrated embodiments herein disclose two mold cavities 140a and 140b for forming two chewable ice cubes, it is contemplated that only one, or more than two mold cavities may be utilized with the various inventions described herein, for example, to produce only one or more than two chewable ice cubes at a time.

In the illustrated embodiment, the ice mold 120 includes a top wall 124, a bottom wall 126, a rear wall 128, a partition wall 132, and opposing side walls 130, that together, define the first and second mold cavities 140a and 140b. Each of the mold cavities 140a and 140b define a respective front opening 120a and 120b for enabling finely crushed ice (FIG. 8) produced by the ice maker 30 to be packed or forced therein, as discussed in detail below. As shown in FIG. 5, the rear wall 128 defines openings 128a that are dimensioned and positioned to freely receive therethrough the ejector pins 106b extending from a rear wall 106 of the enclosure 100.

The ice mold 120 also includes protrusions or sliders 130a that are formed on the respective side walls 130 thereof. In particular, the sliders 130a are shaped and dimensioned to slide within the slots 108a formed in the side walls 108 of the enclosure 100, respectively, to enable the ice mold 120 to slide or translate between a first position (FIG. 6) and a second position (FIG. 9), as described in detail below. Moreover, when the sliders 130a are slidably received by the respective slots 108a of the enclosure 100, the ice mold 120 will be supported by the enclosure 100 such that it cannot move vertically relative thereto, e.g., such that the enclosure 100 will prevent the ice mold 120 from falling through the pass through opening 100a via gravity exerted on the ice mold 120. In other words, the enclosure 100 will slidably support the ice mold 120 therefrom when the sliders 130a are inserted into the respective slots 108a of the enclosure 100.

Still referring to FIG. 5, a door guide 134 extends from the bottom wall 126 of the ice mold 120 and includes a narrowed portion 135 and a widened portion 136. The widened portion 136 defines a planar body 136b (FIG. 6) with a curved distal end 136a extending forwardly therefrom (e.g., toward a front wall 104 of the enclosure 100). Functionally, the door guide 134 is configured to urge the door 150 of the ice packing compartment 90 from the first orientation (FIG. 6) to the second orientation (FIG. 8). In particular, the door guide 134 is configured to synchronously rotate the door 150 from the first orientation to the second orientation when the ice mold 120 is translated from the first position (FIG. 6) to the second position (FIG. 9), for example, in response to a user command (e.g., on a user interface of the appliance) to produce chewable ice cubes, as discussed in detail below. Referring to FIG. 6, a connector 142 is formed on or coupled to a rear wall 128 of the ice mold 120. The connector 142 defines a through-hole (not shown) for receiving a pin (not shown) that is extended therethrough to pivotally couple a link 86 of the reciprocating mechanism 80 to the ice mold 120.

Figure 9:
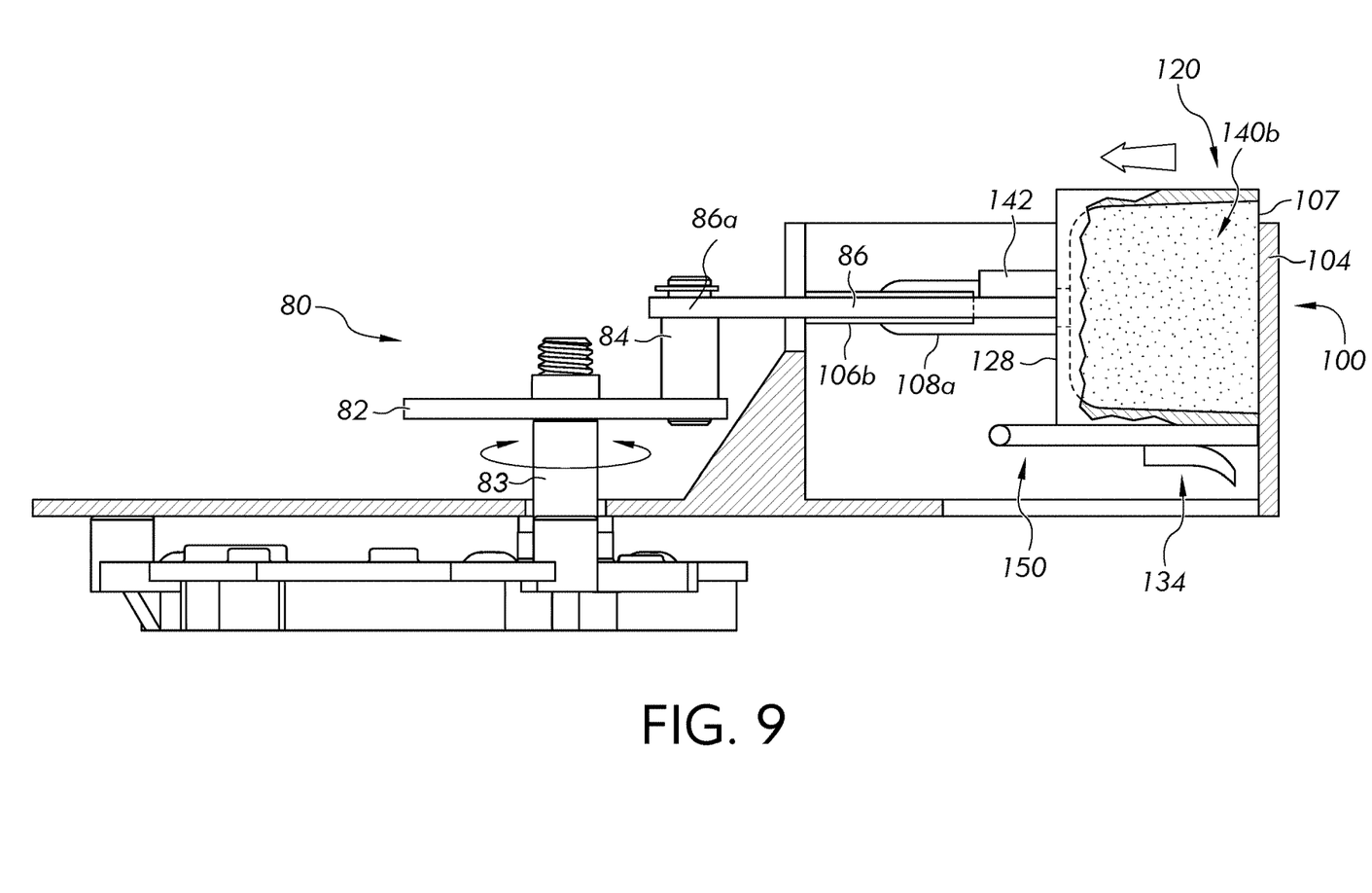
FIG. 9 is a side section view of the ice packer assembly of FIG. 5 taken along line A-A of FIG. 4, wherein the ice mold is shown in the second position and the door is shown in the second orientation.

With reference to FIG. 4, the reciprocating mechanism 80, in general, comprises structure that is configured to successively reciprocate the ice mold 120 between the first position (FIG. 6) and the second position (FIG. 9). In the illustrated embodiment, the reciprocating mechanism 80 is a slider crank mechanism 81 including a driving plate or crank 82 and a link 86. Specifically, the crank 82 is rotatably coupled to the motor assembly 60 via a central shaft 83 extending therebetween. The motor assembly 60 includes an electric motor and optionally a gear train, for example to reduce rotational speed and increase torque. It is to be appreciated that the crank 82 could be coupled directly to the electric motor, or alternatively could be connected to the electric motor via an intervening gear train. Meanwhile, opposing ends of the link 86 are pivotally coupled to the crank 82 and to the ice mold 120, respectively. In particular, a first end 86a of the link 86 is pivotally coupled to the crank 82 via a pin 84a that extends through an upwardly extending shaft 84 of the crank 82. Conversely, a second end 86b of the link 86 is pivotally coupled to the ice mold 120 via a pin (not shown) that extends through the second end 86b of the link 86 and the connector 142 (FIG. 6) of the ice mold 120.

Accordingly, when the motor assembly 60 is operated, it will cause the crank 82 to rotate via the central shaft 83 of the motor assembly 60. Meanwhile, as the crank 82 is rotated, it will cause the position of the first end 86a of the link 86 to change relative to the rear wall 106 of the enclosure 100. For example, as the crank 82 rotates (e.g., during a first half of a revolution thereof), it will cause the first end 86a of the link 86 to move toward a position adjacent to the rear wall 106 of the enclosure 100 (FIG. 9), thereby causing the second end 86b of the link 86 to pass through the opening 106a (FIG. 5) of the enclosure 100 while urging the ice mold 120 toward the second position, e.g., proximate a front wall 104 of the enclosure 100. As the crank 82 continues to rotate (e.g., during a second half of a revolution thereof), it will cause the first end 86a of the link 86 to move back toward a furthermost position (FIG. 6) with respect to the rear wall 106 of the enclosure 100, thereby causing the second end 86b of the link 86 to pull the ice mold 120 back to the first position (FIG. 6). In other words, the crank 82 will cause the ice mold 120 to reciprocate from the first position (FIG. 6) to the second position (FIG. 9) and back to the first position (FIG. 6) during an entire revolution thereof.

Yet, it is contemplated that the reciprocating mechanism 80 may take on other forms for causing the ice mold 120 to reciprocate between the first and second positions. For example, in some embodiments, the crank 82 may embody a pinion gear (not shown) that is configured to rotatably engage a rack gear disposed on the ice mold 120 (not shown) such that a rotation of the crank 82 will cause the rack (and therefore the ice mold) to successively reciprocate between the first and second positions. Yet, it is also contemplated that an eccentric cam (not shown) may be arranged on the crank 82 for cooperating with a reciprocating rod disposed on the ice mold 120 to successively reciprocate the ice mold 120 between the respective first and second positions based on a rotation thereof. In this manner, it should be understood that a wide variety of arrangements are contemplated for causing the ice mold to reciprocate between the first and second positions.

Similarly, it is contemplated that a variety of arrangements may be provided for causing the door 150 of the ice packing compartment 90 to rotate or slide between a first orientation or first position and a second orientation or second position, respectively. For example, in alternative embodiments, a separate motor (not shown) may cause the door to rotate between the first orientation and the second orientation for opening and closing the pass-through opening 100a (FIG. 4) of the enclosure 100, respectively. Alternatively, in such embodiments wherein the door is a sliding door, the motor may cause the door to slide between a first position and a second position to respectively open and close the pass through opening 100a (FIG. 4). Yet, in other embodiments, it is contemplated that the crank 82 may comprise a pinion gear (not shown) that is configured to rotatably engage a reciprocating rack gear (not shown) to translate the rack forwardly (e.g., toward the front wall 104 of the enclosure 100) for urging the door 150 from the first orientation to the second orientation (e.g., during a first half of a revolution of the pinion), and translate the rack rearwardly to disengage from the door such that the door may freely rotate back to the first orientation. Yet, in additional embodiments, it is contemplated that the rack may be affixed to a sliding door (not shown) such that rotating a pinion will cause the rack (and therefore the sliding door) to successively reciprocate between a first position and a second position for respectively opening and closing the pass-through opening 100a (FIG. 4) of the enclosure 100.

In alternative embodiments, it is contemplated that the crank 82 may comprise a rotating cam (not shown) that is configured to cooperate with a reciprocating rod to urge the door toward the second orientation (e.g., during a first half of a revolution thereof), and disengage from the door (e.g., during a second half of a revolution thereof) such that the door may freely rotate back to the first orientation. Yet, it is also contemplated that the reciprocating rod (not shown) may be affixed to a sliding door to reciprocate the sliding door between respective first and second positions based on a rotation of the eccentric cam. In some embodiments, it is contemplated that the door may be spring loaded (e.g., via a torsion spring) for urging the door to either the first position or first orientation or to the second position or the second orientation.

With reference to FIG. 3 and FIGS. 6-10, the ice packer assembly 50 will now be described with respect to one example operation. In general, and as noted above, the ice packer assembly 50 comprises structure that enables a consumer to optionally produce chewable ice cubes on demand, for example, via an operation of a user interface (not shown) on the refrigerator appliance. As shown in FIG. 3, the ice packing compartment 90 is located below an outlet 32 of the ice maker 30. In this manner, crushed ice (and preferably finely crushed ice) produced by the ice maker 30 may be dispensed onto the first planar surface 150a of the door 150 (FIG. 8) when the door 150 is rotated to the second orientation. In other words, when the door 150 is rotated to the second orientation, it will close the pass-through opening 100a of the enclosure 100 such that the first planar surface 150a of the door 150 will define a platform for receiving finely crushed ice thereon. In some embodiments, it is contemplated that the ice maker 30 may include an ice crusher (not shown) that is configured to produce finely crushed ice, for example, by selectively operating supplemental moving blades or by operating moving blades of the ice crusher for an appropriate time period to produce finely crushed ice. It is noted that producing finely crushed ice is desirable for enhancing the moldability of the ice when forming chewable ice cubes, as discussed in detail below.

When a user desires to receive chewable ice cubes, the reciprocating mechanism 80 may be operated to cause the ice mold 120 to translate toward the second position, whereupon finely crushed ice dispensed from the ice maker 30 may be compacted and/or molded into chewable ice cubes. Specifically, and with reference to FIGS. 6-10, operating the reciprocating mechanism 80 will cause the crank 82 to rotate such that a position of the first end 86a of the link 86 (and therefore the ice mold 120) will change relative to the enclosure 100. In particular, as the crank 82 rotates (during a first half of a revolution thereof), the first end 86a of the link will move toward the rear wall 106 of the enclosure 100, thereby causing the link 86 to urge the ice mold 120 (FIG. 7A) toward the second position. When the ice mold 120 is partially translated toward the second position (FIG. 7A), the curved distal end 136a of the door guide 134 will make contact with the second planar surface 150b of the door 150, thereby causing the door 150 to rotate upon the pivot pins 152a inserted in the respective side walls 108 of the enclosure 100. As the ice mold 120 continues to translate toward the second position, the narrowed portion 135 (FIG. 5) of the door guide 134 will enter the longitudinal slot 154 (FIG. 5) formed in the door 150, thereby enabling the ice mold 120 to continue translating toward the second position. In other words, the longitudinal slot 154 (FIG. 5) embodies a form of a track that enables the ice mold 120 to continue to move toward the second position such that the door 150 does not obstruct the translational path of the ice mold 120 between the first position and the second position.

Figures 7A, 7B:
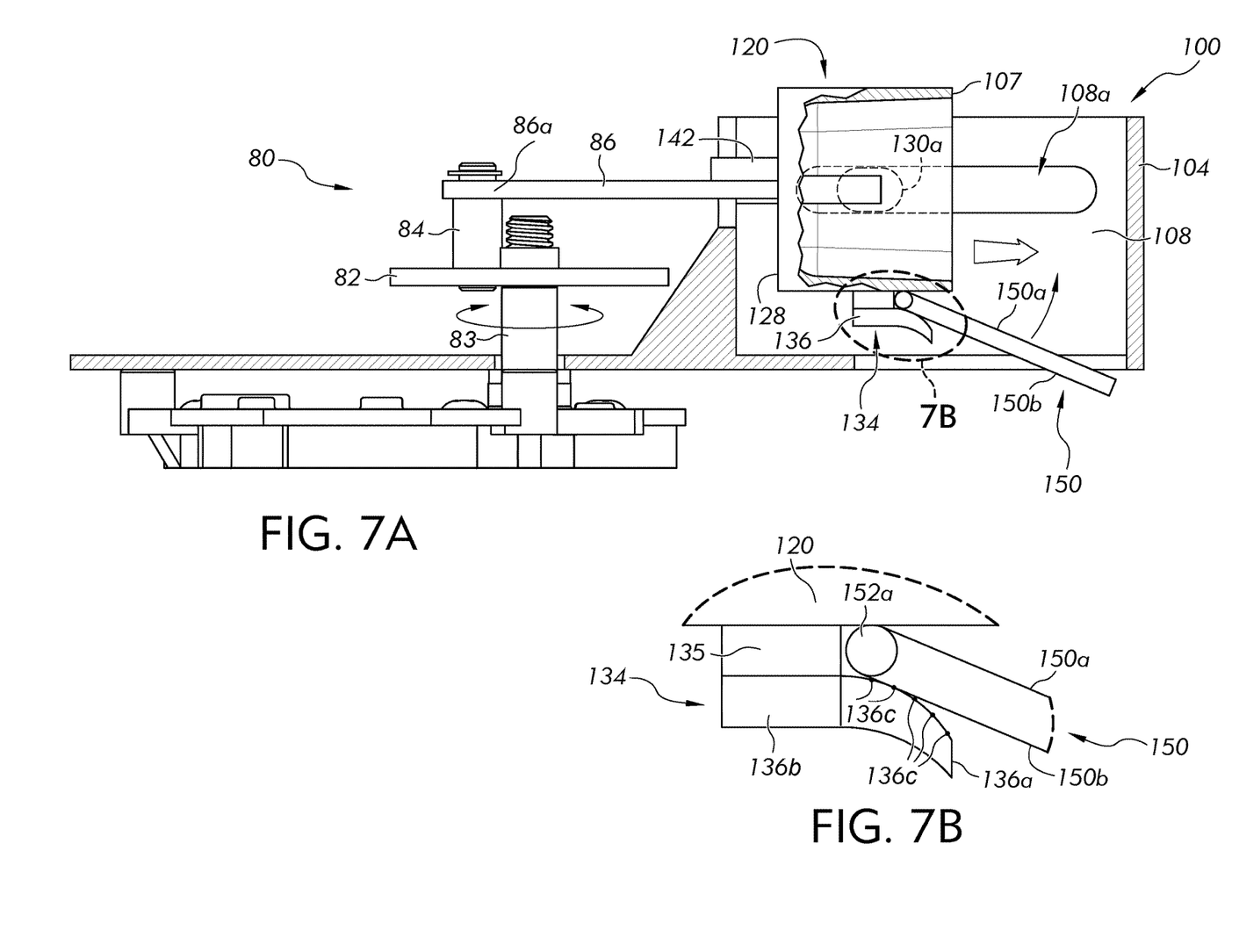
FIG. 7A is a side section view of the ice packer assembly of FIG. 4 taken along line A-A of FIG. 4 in a state wherein the ice mold is being slid toward a second position and the door is being rotated to a second orientation.
FIG. 7B is a closeup view of the area bounded by dashed lines in FIG. 7A.

Referring to FIGS. 7A and 7B, as the ice mold 120 continues to translate toward the second position, the curved distal end 136a of the door guide 134 will continue to make contact with the second planar surface 150b of the door 150 to urge the door 150 toward the second orientation. Specifically, and as shown in FIG. 7B, the external contour of the curved distal end 136a defines a plurality of surface contact points 136c, each of which is intended to slidably contact the second planar surface 150b of the door 150 to enable the door 150 to gradually rotate as the ice mold 120 is translated toward the second position. Although described as a "curved" distal end 136a, it is to be appreciated that the distal end 136a could also be angular and function in a similar manner.

Referring to FIG. 8, when the ice mold 120 is translated toward a predetermined point along its translational path, the second planar surface 150b of the door 150 will no longer make contact the curved distal end 136a. At this stage, the second planar surface 150b will begin to slidably contact an upper surface of the planar body 136b of the door guide 134, thereby causing the door 150 to be substantially horizontal as shown. In this manner, the planar body 136*b* of the door guide 134 is configured to cause the door 150 to attain the second orientation (e.g., substantially horizontal as shown). In other words, when the ice mold 120 is partially translated toward the second position, it will synchronously cause the door 150 to be rotated to the second orientation such that the door 150 will block the pass through opening 100*a* of the enclosure 100 and define a platform for receiving crushed ice thereon. Additionally, as the narrowed portion 135 of the door guide 134 enters the longitudinal slot 154 (FIG. 4) of the door 150, the door 150 will become confined or sandwiched (FIG. 8) between the widened portion 136 of the door guide 134 and the bottom wall 126 of the ice mold 120. In other words, the widened portion 136 of the door guide 134 will abut against the door 150, and specifically against the second planar surface 150*b* thereof to retain the door 150 in the second orientation, i.e. to prevent the door 150 from freely rotating back to the first orientation.

Still referring to FIG. 8, when the door 150 has reached the second orientation, the reciprocating mechanism 80 may stop translating the ice mold 120 toward the second position thereof such that the ice maker 30 may be operated to dispense finely crushed ice onto the first planar surface 150*a* of the door 150 (FIG. 8), as shown. After a sufficient amount of ice is deposited on the first planar surface 150*a* of the door 150, the reciprocating mechanism 80 may continue to operate such that first end 86*a* of the link 86 will continue to move closer toward the enclosure 100, thereby urging the ice mold 120 closer to the second position, i.e. via the link 86 therebetween. Specifically, and referring to FIG. 9, when the crank 82 is rotated to a first half of a revolution thereof, it will cause the ice mold 120 to reach the second position, whereby the front edge 107 of the ice mold 120 will be positioned adjacent to the front wall 104 of the enclosure and in an abutting arrangement therewith. Accordingly, the ice mold 120 and the front wall 104 of the enclosure 100 will cooperate to pack or force crushed ice deposited on the first planar surface 150*b* (FIG. 8) of the door 150 into the mold cavities 140*a*, 140*b* (FIG. 5) of the ice mold 120. Specifically, as the ice mold 120 is urged to translate to the second position, the front wall 104 of the enclosure 100 will force the crushed ice deposited on the first planar surface 150*b* of the door 150 into the mold cavities 140*a*, 140*b* of the ice mold 120 through the respective openings 120*a*, 120*b* (FIG. 5) thereof, whereupon the crushed ice may be compacted or molded to form chewable ice cubes. In other words, the crushed ice, and preferably finely crushed ice (e.g., moldable ice) ice will be compacted in the mold cavities 140*a*, 140*b* into a shape corresponding to the general contour of the mold cavities 140*a*, 140*b* to form chewable ice cubes, as shown. The crank 82 may be rotated to move the ice mold 120 in a single compaction operation, or may be rotated or pulsed multiple times back and forth to cause a number of compaction operations to be performed by the ice mold 120 upon the crushed ice.

Figure 10:
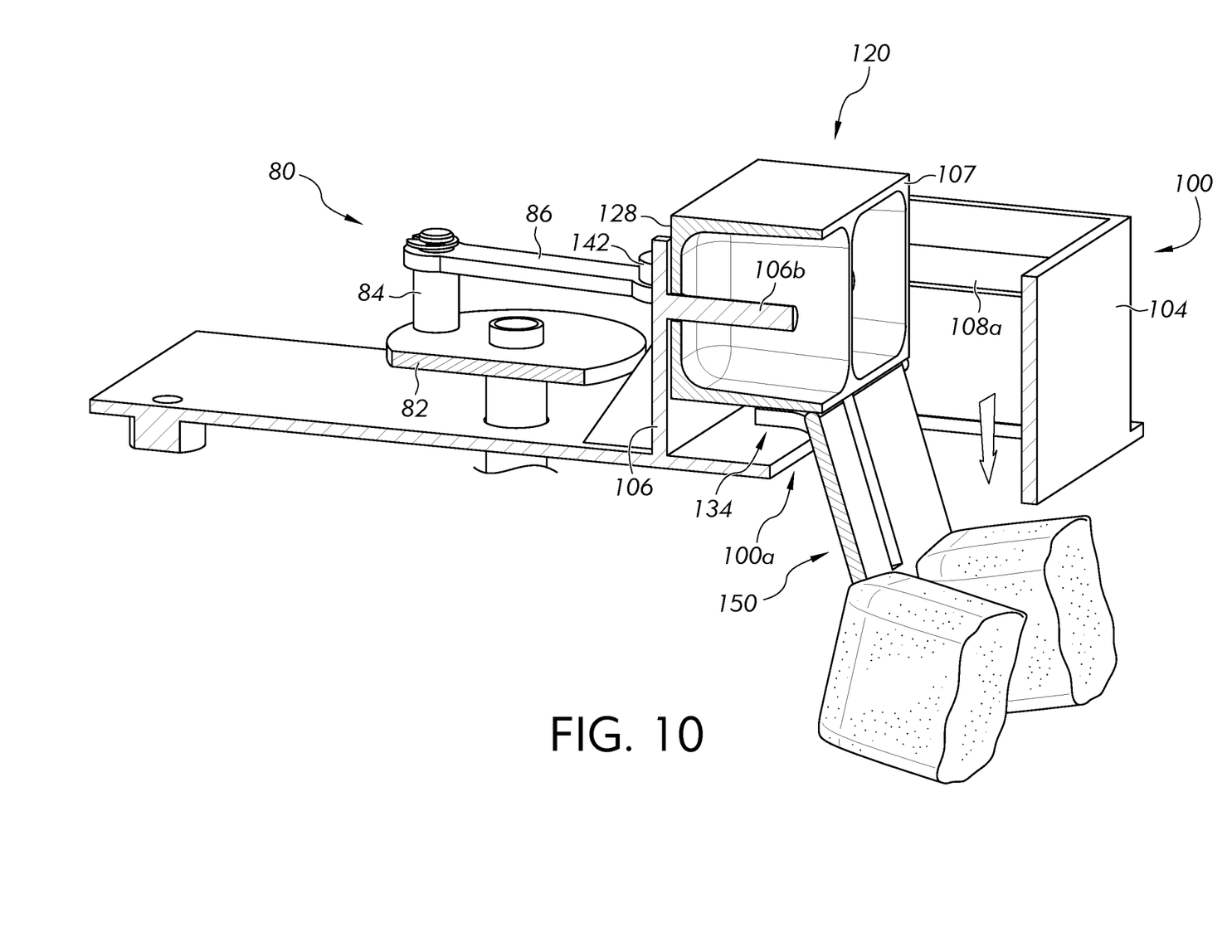
FIG. 10 is a section view of the ice packer assembly of FIG. 4 taken along line B-B of FIG. 4 in a state wherein chewable ice cubes are being ejected out of ice molds of the ice packer assembly.

Next, as the crank 82 continues to rotate (during a second half of a revolution thereof), it will cause the position of the first end 86*a* of the link to move back toward a furthermost position with respect to the enclosure 100. In this manner, the link 86 will pull the ice mold 120 (together with the now-compacted crushed ice) to return to the first position. Disengagement of the door guide 134 with the door 150 will likewise cause the door 150 to return to the open, first orientation. Referring to FIG. 10, when the ice mold 120 is translated to return to the first position, the fixed-position ejector pins 106*b* extending from a rear wall 106 of the enclosure 100 will protrude into the ice mold 120 through the openings 128*a* (FIG. 5) formed in a rear wall 128 thereof and press upon the compacted ice cubes, thereby causing the chewable ice cubes to be forced out of the mold cavities 140*a*, 140*b*, such that they may fall through the pass through opening 100*a* of the enclosure 100 and enter the ice chute 22 (FIG. 3) leading to the dispenser 18 (FIG. 1) of the refrigerator 10 (FIG. 1).

Alternatively, it is contemplated that a consumer may wish to dispense conventional ice cubes or crushed ice from the dispenser 18 (FIG. 1), for example via inputs made to the user interface of the appliance. In such instances, the ice mold 120 may be translated to or remain in the first position (FIG. 6) such that ice produced by the ice maker 30 (FIG. 3) may pass through the pass through opening 100*a* of the enclosure 100, whereupon it may enter the chute 22 extending through the refrigerator door 26 leading to the dispenser 18. In other words, ice produced by the ice maker 30 may bypass the ice packer assembly 50 in a state wherein the door 150 is rotated to the first orientation (FIG. 4) and the ice mold 120 is translated to the first position (FIG. 4). In alternative embodiments, it is contemplated that conventional ice cubes and/or crushed ice may be made accessible to a user via a removable ice basket (not shown) or bin located in the ice maker 30.

The invention has been described with reference to the example embodiments described above. Modifications and alterations will occur to others upon a reading and understanding of this specification. Moreover, the ice packer assemblies described herein may be adapted for placement in different refrigerator configurations (e.g., French-door, Top mount, Bottom mount). Example embodiments incorporating one or more aspects of the invention are intended to include all such modifications and alterations insofar as they come within the scope of the appended claims and their equivalents.

What is claimed:

1. An ice packer for an appliance to form chewable ice cubes, comprising:
   an enclosure defining a pass-through opening extending between an upper end and a lower end thereof;
   a door pivotally coupled to the enclosure and rotatable between a first orientation and a second orientation, wherein the door further comprises pivot pins extending laterally from the door to pivotally couple the door to the enclosure, wherein the door opens the pass-through opening when it is rotated to the first orientation, and wherein the door closes the pass-through opening when it is rotated to the second orientation; and
   an ice mold slidably supported by the enclosure and configured to translate between a first position and a second position, wherein the ice mold defines a cavity therein, and
   wherein when the door is rotated to the second orientation, it defines a platform for receiving ice thereon that is compacted in the cavity of the ice mold when the ice mold is translated toward the second position.

2. The ice packer according to claim 1, wherein the enclosure includes a front wall and a rear wall spaced apart and connected by opposing side walls, and wherein each side wall defines a slot extending along a partial longitudinal length thereof, and
   wherein the ice mold includes a top wall, a bottom wall, a rear wall, and opposing side walls, and wherein a protrusion is formed on each side wall and is configured to be slidably received by the respective slot of the enclosure to slidably support the ice mold from the enclosure and enable the ice mold to be translate between the first position and the second position.

3. The ice packer according to claim 1, wherein when the ice mold is translated toward the first position, it causes the door to rotate to the first orientation thereby opening up the pass-through opening, and wherein when the ice mold is translated to the second position, it causes the door to rotate to the second orientation thereby closing the pass-through opening and defining the platform for receiving ice thereon.

4. The ice packer according to claim 3, wherein the ice mold further comprises a guide extending from a bottom wall thereof that is configured urge the door to rotate from the first orientation to the second orientation.

5. The ice packer according to claim 4, wherein the guide further comprises a curved distal end that is configured to slidably contact a planar surface of the door such that the door is gradually rotated from the first orientation to the second orientation as the ice mold is translated toward the second position.

6. The ice packer according to claim 4, wherein the guide further comprises a narrowed portion and a widened portion, and wherein the door further comprises a longitudinal slot extending therethrough that is configured to receive the narrowed portion of the guide therethrough to enable the ice mold to be translated toward the second position.

7. The ice packer according to claim 6, wherein the door further comprises a first planar surface and a second planar surface, and wherein the widened portion of the guide is configured to abut against the second planar surface of the door to retain the door in the second orientation.

8. The ice packer according to claim 1, wherein the enclosure further comprises side walls defining the respective openings therethrough, and wherein the pivot pins are configured to be inserted into the respective openings.

9. The ice packer according to claim 1, wherein the enclosure further comprises:
an ejector extending from a rear wall thereof and into an internal space defined by the enclosure, wherein the ejector is configured to cause ice molded in the ice mold to be ejected therefrom when the ice mold is translated from the second position to the first position.

10. The ice packer according to claim 1, wherein the door comprises a first planar surface and a second planar surface, and wherein the first planar surface defines the platform for receiving crushed ice thereon when the door is rotated to the second orientation, and wherein the enclosure further comprises a front wall, and wherein the front wall of the enclosure is configured to force crushed ice deposited on the first planar surface of the door into the ice mold when the ice mold is translated to the second position.

11. An ice packer assembly for a refrigerator appliance, comprising:
a reciprocating mechanism; and
an ice packing compartment comprising:
an enclosure defining a pass-through opening extending between an upper end and a lower end thereof,
a door pivotally coupled to the enclosure and rotatable between a first orientation and a second orientation, wherein the door opens the pass-through opening when it is rotated to the first orientation, and wherein the door closes the pass-through opening when it is rotated to the second orientation, and
an ice mold slidably supported by the enclosure and pivotally coupled to the reciprocating mechanism, and wherein the reciprocating mechanism is configured to translate the ice mold between a first position and a second position relative to the enclosure,
wherein the ice mold further comprises a guide extending from a bottom wall thereof, wherein the guide is configured to urge the door toward the second orientation when the ice mold is translated to the second position.

12. The ice packer assembly according to claim 11, wherein the ice packer assembly further comprises a motor assembly, and wherein the reciprocating mechanism further comprises a crank and a link, wherein the crank is rotatably coupled to the motor assembly via a shaft, and wherein opposing ends of the link are pivotally coupled to the crank and the ice mold, respectively, and wherein the crank is configured to cause the link to urge the ice mold to translate between the first position and the second position during a rotation thereof.

13. The ice packer assembly according to claim 12, wherein the enclosure further comprises a front wall, a rear wall, and opposing side walls that are spaced apart and connected by the front wall and the rear wall, and wherein the rear wall defines an opening therein that is configured to enable the link of the reciprocating mechanism to pass therethrough to pivotally couple the link to the ice mold.

14. The ice packer assembly according to claim 11, wherein the enclosure includes a front wall and a rear wall spaced apart and connected by opposing side walls, and wherein each side wall defines a slot extending along a partial longitudinal length thereof, and
wherein the ice mold includes a top wall, a bottom wall, a rear wall, and opposing side walls, and wherein a protrusion is formed on each side wall and is configured to be slidably received by the respective slot of the enclosure to slidably support the ice mold from the enclosure and enable the ice mold to be translated between the first position and the second position.

15. The ice packer assembly according to claim 11, wherein the guide further comprises a curved distal end that is configured to slidably contact a planar surface of the door such that the door is gradually rotated from the first orientation to the second orientation when the ice mold is translated toward the second position.

16. The ice packer assembly according to claim 11, wherein the guide further comprises a narrowed portion and a widened portion, and wherein the door further comprises a longitudinal slot extending therethrough that is configured to receive therein the narrowed portion of the guide to enable the ice mold to be fully translated to the second position.

17. The ice packer assembly to claim 16, wherein the door further comprises a first planar surface and a second planar surface, and wherein the widened portion of the guide is configured to abut against the second planar surface of the door to retain the door in the second orientation.

18. An ice packer for producing chewable ice cubes, comprising:
an enclosure defining a pass-through opening extending between an upper end and a lower end thereof;
a door coupled to the enclosure and movable between a first position and a second position, wherein the door opens up the pass-through opening of the enclosure when it is moved to the first position, and wherein the door closes the pass-through opening and defines a platform for receiving ice thereon when it is moved to the second position; and
an ice mold slidably supported by the enclosure and configured to reciprocate between a first location and a second location, wherein the ice mold is configured to form said chewable ice cube when it is reciprocated to the second location, wherein when the ice mold is translated toward the first position, it causes the door to rotate to the first orientation thereby opening up the pass-through opening, and wherein when the ice mold is translated to the second position, it causes the door to rotate to the second orientation thereby closing the pass-through opening and defining the platform for receiving ice thereon, and wherein the ice mold further comprises a guide extending from a bottom wall thereof that is configured urge the door to rotate from the first orientation to the second orientation.

19. An ice packer for an appliance to form chewable ice cubes, comprising:

an enclosure defining a pass-through opening extending between an upper end and a lower end thereof;

a door pivotally coupled to the enclosure and rotatable between a first orientation and a second orientation, wherein the door opens the pass-through opening when it is rotated to the first orientation, and wherein the door closes the pass-through opening when it is rotated to the second orientation; and an ice mold slidably supported by the enclosure and configured to translate between a first position and a second position, wherein the ice mold defines a cavity therein, wherein when the door is rotated to the second orientation, it defines a platform for receiving ice thereon that is compacted in the cavity of the ice mold when the ice mold is translated toward the second position, wherein when the ice mold is translated toward the first position, it causes the door to rotate to the first orientation thereby opening up the pass-through opening, and wherein when the ice mold is translated to the second position, it causes the door to rotate to the second orientation thereby closing the pass-through opening and defining the platform for receiving ice thereon, and wherein the ice mold further comprises a guide extending from a bottom wall thereof that is configured urge the door to rotate from the first orientation to the second orientation.

* * * * *